United States Patent
Sekiguchi et al.

(10) Patent No.: US 12,119,454 B2
(45) Date of Patent: Oct. 15, 2024

(54) ALL SOLID BATTERY AND MANUFACTURING METHOD OF THE SAME

(71) Applicant: TAIYO YUDEN CO., LTD., Tokyo (JP)

(72) Inventors: Masashi Sekiguchi, Tokyo (JP); Daigo Ito, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 174 days.

(21) Appl. No.: 17/153,493

(22) Filed: Jan. 20, 2021

(65) Prior Publication Data

US 2021/0280915 A1    Sep. 9, 2021

(30) Foreign Application Priority Data

Mar. 3, 2020  (JP) ................................. 2020-035835

(51) Int. Cl.
*H01M 10/0585* (2010.01)
*H01M 10/0525* (2010.01)
*H01M 10/0562* (2010.01)

(52) U.S. Cl.
CPC ... *H01M 10/0585* (2013.01); *H01M 10/0525* (2013.01); *H01M 10/0562* (2013.01); *H01M 2300/0068* (2013.01)

(58) Field of Classification Search
CPC ........................ H01M 10/0562; H01M 10/0585
See application file for complete search history.

(56) References Cited

U.S. PATENT DOCUMENTS

| | | | |
|---|---|---|---|
| 2012/0135285 A1 | 5/2012 | Iwama et al. | 429/94 |
| 2013/0017435 A1 | 1/2013 | Sato et al. | 429/158 |

(Continued)

FOREIGN PATENT DOCUMENTS

| | | |
|---|---|---|
| JP | 2011-165410 A | 8/2011 |
| JP | 2011-216235 A | 10/2011 |

(Continued)

OTHER PUBLICATIONS

Xiao, Zhuo-bing, Chen Shang, and Man-man Guo. "Influence of Li3PO4 addition on properties of lithium ion-conductive electrolyte Li1. 3AI0. 3Ti1. 7(PO4)3." Transactions of Nonferrous Metals Society of China 21.11 (2011): 2454-2458. (Year: 2011).*

(Continued)

*Primary Examiner* — Sadie White
*Assistant Examiner* — Kayla Elaine Clary
(74) *Attorney, Agent, or Firm* — Stein IP, LLC

(57) ABSTRACT

An all solid battery includes a multilayer structure in which solid electrolyte layers and internal electrodes are alternately stacked, the plurality of internal electrodes including an electrode active material and a carbon material, the multilayer structure having a rectangular parallelepiped shape, the plurality of internal electrodes being alternately exposed to two different faces of the multilayer structure, a first cover layer provided on an upper face of the multilayer structure in a stacking direction, and a second cover layer provided on a lower face of the multilayer structure in the stacking direction. Each thickness of the plurality of internal electrodes is equal to or more than each thickness of the plurality of solid electrolyte layers. Vickers hardness of the plurality of solid electrolyte layers and Vickers hardness of the first and second cover layers are larger than Vickers hardness of the plurality of internal electrodes.

6 Claims, 5 Drawing Sheets

(56) References Cited

U.S. PATENT DOCUMENTS

| | | | |
|---|---|---|---|
| 2017/0263981 A1* | 9/2017 | Satou | H01M 4/663 |
| 2019/0131654 A1 | 5/2019 | Ito et al. | |
| 2019/0363399 A1* | 11/2019 | Yoshioka | H01M 50/528 |
| 2020/0381774 A1* | 12/2020 | Ueno | H01M 10/0585 |

FOREIGN PATENT DOCUMENTS

| | | | |
|---|---|---|---|
| JP | 2013-026031 A | 2/2013 | |
| JP | 2015-176819 A | 10/2015 | |
| JP | 2015-220106 A | 12/2015 | |
| JP | 2019-087348 A | 6/2019 | |
| WO | WO 2015/147280 A1 | 10/2015 | |
| WO | WO-2019181909 A1 * | 9/2019 | H01M 10/0562 |

OTHER PUBLICATIONS

Wolfenstine, Jeff, Jan L. Allen, and James Sumner. Hot-Pressed versus Sintered LiTi2(PO4)3. Army Research Lab Adelphi MD Sensors and Electron Devices Directorate, 2009. (Year: 2009).*

Duluard, Sandrine, et al. "Lithium conducting solid electrolyte Li1.3Al0.3Ti1. 7(PO4)3 obtained via solution chemistry." Journal of the European Ceramic Society 33.6 (2013): 1145-1153. (Year: 2013).*

Hu, Xing, et al. "All-solid-state supercapacitors based on a carbon-filled porous/dense/porous layered ceramic electrolyte." Journal of The Electrochemical Society 165.7 (2018): A1269. (Year: 2018).*

Fuchs, Till, et al. "Increasing the Pressure-Free Stripping Capacity of the Lithium Metal Anode in Solid-State-Batteries by Carbon Nanotubes." Advanced Energy Materials (2022): 2201125. (Year: 2022).*

DeWees, Rachel, and Hui Wang. "Synthesis and properties of NaSICON-type LATP and LAGP solid electrolytes." ChemSusChem 12.16 (2019): 3713-3725. (Year: 2019).*

Notification of First Office Action dated Oct. 16, 2023, issued by the China National Intellectual Property Administration in corresponding application CN 202110223744.X.

Jeffrey B. Wolfenstine et al., "Electrical and mechanical properties of hot-pressed versus sintered $LiTi_2(PO_4)_3$", Solid State Ionics, vol. 180, pp. 961-967, Jun. 25, 2009.

* cited by examiner

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2020-035835, filed on Mar. 3, 2020, the entire contents of which are incorporated herein by reference.

FIELD

A certain aspect of the present invention relates to an all solid battery and a manufacturing method of the all solid battery.

BACKGROUND

An all solid battery does not include combustible liquid. Therefore, the all solid battery has high safety. For example, the all solid battery has a multilayer structure. Thus, the all solid battery has a small ship size and can be mounted on a substrate (for example, see Japanese Patent Application Publication No. 2011-216235 and Japanese Patent Application Publication No. 2015-220106).

SUMMARY OF THE INVENTION

It is thought that, as a conductive auxiliary agent, a carbon material is used in an electrode of an all solid battery. However, when the carbon material is added to the electrode, mechanical strength of the electrode may be degraded. On the other hand, from a viewpoint of improving cell characteristic such as a capacity density or responsiveness, it is favorable that the electrode has a large thickness. However, when the electrode having small mechanical strength has a large thickness, mechanical strength of a whole of the all solid battery may be degraded.

According to an aspect of the present invention, there is provided an all solid battery including: a multilayer structure in which each of a plurality of solid electrolyte layers and each of a plurality of internal electrodes are alternately stacked, the plurality of internal electrodes including an electrode active material and a carbon material, the multilayer structure having a rectangular parallelepiped shape, the plurality of internal electrodes being alternately exposed to two different faces of the multilayer structure; a first cover layer provided on an upper face of the multilayer structure in a stacking direction; and a second cover layer provided on a lower face of the multilayer structure in the stacking direction, wherein each thickness of the plurality of internal electrodes is equal to or more than each thickness of the plurality of solid electrolyte layers, and wherein Vickers hardness of the plurality of solid electrolyte layers and Vickers hardness of the first and second cover layers are larger than Vickers hardness of the plurality of internal electrodes.

According to an aspect of the present invention, there is provided a manufacturing method of an all solid battery including: preparing a multilayer structure including a multilayer portion, a first cover sheet on an upper face of the multilayer portion in a stacking direction, and a second cover sheet on a lower face of the multilayer portion in the stacking direction, the multilayer portion having a structure in which a solid electrolyte green sheet that includes a solid electrolyte and a first sintering assistant and a pattern of paste for internal electrode that includes an electrode active material and a carbon material and has a thickness that is equal to or more than a thickness of the solid electrolyte green sheet are stacked, the first cover sheet and the second cover sheet including a second sintering assistant; firing the multilayer structure, wherein an amount of the first sintering assistant added to the solid electrolyte green sheet and an amount of the second sintering assistant added to the first and second cover sheets are adjusted so that Vickers hardness of a solid electrolyte layer formed by firing the solid electrolyte green sheet and Vickers hardness of cover layers formed by firing the first and second cover sheets are larger than Vickers harness of an internal electrode layer formed by firing the pattern.

DETAILED DESCRIPTION

A description will be given of an embodiment with reference to the accompanying drawings.

Figure 1:
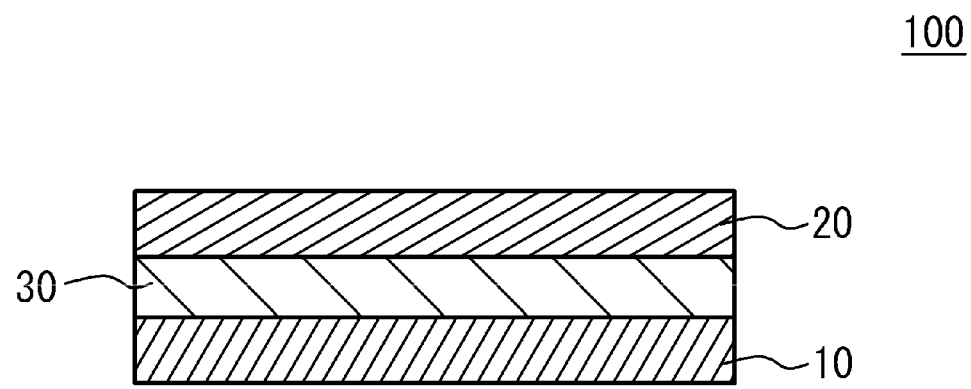
FIG. 1 illustrates a schematic cross section of a basic structure of an all solid battery.

(Embodiment) FIG. 1 illustrates a schematic cross section of a basic structure of an all solid battery 100 in accordance with an embodiment. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The second internal electrode 20 is provided on a second main face of the solid electrolyte layer 30.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is solid electrolyte having ionic conductivity. The solid electrolyte of the solid electrolyte layer 30 is an oxide-based solid electrolyte having lithium ion conductivity. The solid electrolyte is phosphoric acid salt-based electrolyte having a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—PO$_4$-based material, to which a transition metal included in the phosphoric acid salt having the olivine type crystal structure included in the first internal electrode 10 and the second internal electrode 20 is added in advance, is used. For example, when the first internal electrode 10 and the second internal electrode 20 include phosphoric acid salt including Co and Li, it is preferable that the solid electrolyte layer 30 includes Li—Al—Ge—PO$_4$-based material to which Co is added in advance. In this case, it is possible to suppress solving of the transition metal included in the electrode active material into the electrolyte. When the first internal electrode 10 and the second internal electrode 20 include phosphoric acid salt including Li and a transition metal other than Co, it is preferable that the solid electrolyte layer 30 includes Li—Al—Ge—PO$_4$-based material in which the transition metal is added in advance.

At least, the first internal electrode 10 used as a positive electrode includes a material having an olivine type crystal structure, as an electrode active material. It is preferable that the second internal electrode 20 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, LiCoPO$_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or PO$_4$ may fluctuate in accordance with a valence. It is preferable that Co, Mn, Fe, Ni or the like is used as the transition metal.

The electrode active material having the olivine type crystal structure acts as a positive electrode active material in the first internal electrode 10 acting as a positive electrode. For example, when only the first internal electrode 10 includes the electrode active material having the olivine type crystal structure, the electrode active material acts as the positive electrode active material. When the second internal electrode 20 also includes an electrode active material having the olivine type crystal structure, discharge capacity may increase and an operation voltage may increase because of electric discharge, in the second internal electrode 20 acting as a negative electrode. The function mechanism is not completely clear. However, the mechanism may be caused by partial solid-phase formation together with the negative electrode active material.

When both the first internal electrode 10 and the second internal electrode 20 include an electrode active material having the olivine type crystal structure, the electrode active material of each of the first internal electrode 10 and the second internal electrode 20 may have a common transition metal. Alternatively, the a transition metal of the electrode active material of the first internal electrode 10 may be different from that of the second internal electrode 20. The first internal electrode 10 and the second internal electrode 20 may have only single type of transition metal. The first internal electrode 10 and the second internal electrode 20 may have two or more types of transition metal. It is preferable that the first internal electrode 10 and the second internal electrode 20 have a common transition metal. It is more preferable that the electrode active materials of the both electrode layers have the same chemical composition. When the first internal electrode 10 and the second internal electrode 20 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second internal electrode 20 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode 20. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode 10 and the second internal electrode 20, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. In the embodiment, a carbon material is used as the conductive auxiliary agent. A metal material may be used as the auxiliary agent, in addition to the carbon material. Pd, Ni, Cu, or Fe, or an alloy thereof may be used as the metal material of the conductive auxiliary agent. For example, the electrolyte of the first internal electrode 10 and the second internal electrode 20 may be the same as the main component solid electrolyte of the solid electrolyte layer 30.

Figure 2:
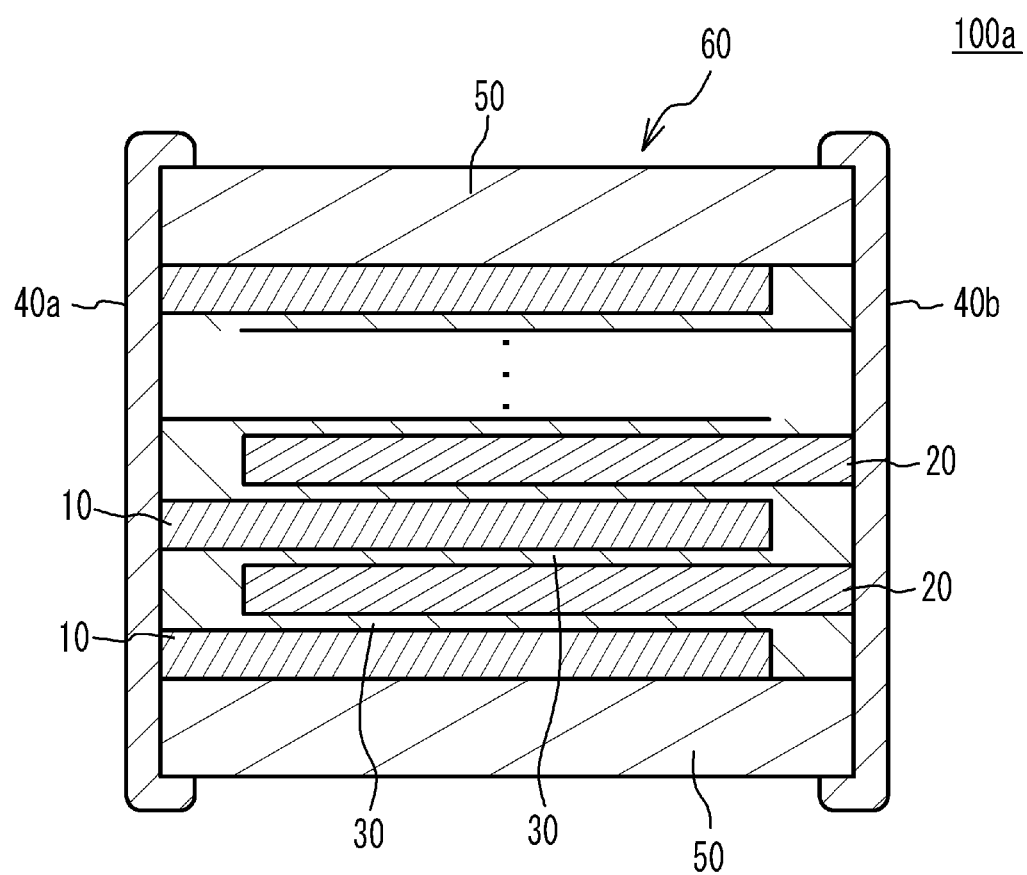
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape. Each of a first external electrode 40a and a second external electrode 40b is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40a is provided on one of the two facing side faces (end faces), and the second external electrode 40b is provided on the other of the two facing side faces.

In the following description, the same numeral is added to each member that has the same composition range, the same thickness range and the same particle distribution range as that of the all solid battery 100. And, a detail explanation of the same member is omitted. In the all solid battery 100a, each of the first internal electrodes 10 and each of the second internal electrodes 20 are alternately stacked through each of the solid electrolyte layers 30. Edges of the first internal electrodes 10 are exposed to the first edge face of the multilayer chip 60 but are not exposed to the second edge face of the multilayer chip 60. Edges of the second internal electrodes 20 are exposed to the second edge face of the multilayer chip 60 but are not exposed to the first edge face. Thus, each of the first internal electrodes 10 and each of the second internal electrodes 20 are alternately conducted to the first external electrode 40a and the second external electrode 40b. The solid electrolyte layer 30 extends from the first external electrode 40a to the second external electrode 40b. In the all solid battery 100a, the all solid battery 100a has a structure in which a plurality of cell units are stacked.

A cover layer 50 is formed on an upper face of the multilayer structure of the first internal electrodes 10, the solid electrolyte layers 30 and the second internal electrodes 20 (in FIG. 2, an upper face of an uppermost first internal electrode 10). Another cover layer 50 is formed on a lower face of the multilayer structure (in FIG. 2, a lower face of an lowermost first internal electrode 10). A main component of the cover layers 50 is an inorganic material including Al, Zr, Ti or the like (for example, $Al_2O_3$, $ZrO_2$, $TiO_2$ or the like). The main component of the cover layers 50 may be the main component of the solid electrolyte layer 30.

It is expected that the carbon material of the first internal electrode 10 and the second internal electrode 20 acts as the conductive auxiliary agent and acts as the electrode active material. However, when the first internal electrode 10 and the second internal electrode 20 include the carbon material, mechanical strength of the first internal electrode 10 and the second internal electrode 20 may be degraded. On the other hand, it is favorable that the thicknesses of the first internal electrode 10 and the second internal electrode 20 are equal to or more than the thickness of the solid electrolyte layer 30, from a viewpoint of improving of cell characteristic such as capacity density or responsiveness. However, when the thickness of the electrode having a low mechanical strength is large, the mechanical strength of whole of the all solid battery 100a may be degraded. And so, the all solid battery 100a of the embodiment has a structure for securing the cell characteristic and the mechanical strength.

The thickness of the first internal electrode 10 and the thickness of the second internal electrode 20 are equal to or larger than the thickness of the solid electrolyte layer 30. Alternatively, the thicknesses of the first internal electrode 10 and the second internal electrode 20 are larger than the thickness of the solid electrolyte layer 30. With the structure, the cell characteristic such as the capacity density or the responsiveness is improved. Next, on the surface of the multilayer chip 60, the solid electrolyte layer 30 and the cover layer 50 have Vickers hardness larger than the Vickers hardness of the first internal electrode 10 and the Vickers hardness of the second internal electrode 20. With the structure, the mechanical strength of the first internal electrode 10 and the second internal electrode 20 is improved. And, it is possible to absorb the degradation of the mechanical strength of the first internal electrode 10 and the second internal electrode 20. Therefore, the mechanical strength of the all solid battery 100a is improved. Accordingly, the all solid battery 100a can secure the cell characteristic and the mechanical strength. The Vickers hardness can be calculated by measuring lengths of diagonal lines of indentation formed by pressing at load of 25 gf for 10 seconds.

When the Vickers hardness of the solid electrolyte layer 30 and the Vickers hardness of the cover layer 50 are low, the all solid battery 100a may not necessarily achieve sufficiently large mechanical strength. And so, it is preferable that the Vickers hardness of the solid electrolyte layer 30 and the Vickers hardness of the cover layer 50 have a lower limit. For example, on the surface of the multilayer chip 60, the Vickers hardness (Hv) of the solid electrolyte layer 30 is 300 or more. It is more preferable that the Vickers hardness is 400 or more. It is still more preferable that the Vickers hardness is 500 or more. It is preferable that the Vickers hardness (Hv) of the cover layer 50 is 280 or more. It is more preferable that the Vickers hardness is 330 or more. It is still more preferable that the Vickers hardness is 350 or more. A total thickness of a center portion (repetitive portion of the first internal electrodes 10, the solid electrolyte layers 30 and the second internal electrodes 20) is larger than a total thickness of a cover portion (the two cover layers 50). Therefore, the strength of the center portion has larger influence on the whole of the all solid battery 100a than the cover portion. And so, it is preferable that the Vickers hardness of the solid electrolyte layers 30 is larger than the Vickers hardness of the cover layer 50. It is possible to adjust the Vickers hardness of the solid electrolyte layer 30 and the Vickers hardness of the cover layer 50 by adjusting an amount of the sintering agent in the forming of the solid electrolyte layer 30 and the cover layer 50 by sintering from a powder material.

From a viewpoint of improving the cell characteristic such as the capacity density or the responsiveness of the all solid battery 100a, it is preferable that the first internal electrode 10 and the second internal electrode 20 have a large thickness. And so, it is preferable that the thickness of the first internal electrode 10 and the thickness of the second internal electrode 20 have a lower limit. For example, it is preferable that the thickness of the first internal electrode 10 and the thickness of the second internal electrode 20 are 5 μm or more. It is more preferable that the thicknesses are 10 μm or more. It is still more preferable that the thicknesses are 20 μm or more. The thickness of the first internal electrode 10 may be different from that of the second internal electrode 20.

When the first internal electrode 10 and the second internal electrode 20 including the carbon material have a large thickness, the mechanical strength of the all solid battery 100a may be degraded. And so, it is preferable that the thickness of the first internal electrode 10 and the thickness of the second internal electrode 20 have an upper limit. For example, it is preferable that the thickness of the first internal electrode 10 and the thickness of the second internal electrode are 100 μm or less. It is more preferable that the thicknesses are 80 μm or less. It is still more preferable that the thicknesses are 60 μm or less.

From a viewpoint of sufficiently improving the mechanical strength of the all solid battery 100a, it is preferable that the solid electrolyte layer 30 and the cover layer 50 have a large thickness. And so, it is preferable that the thickness of the solid electrolyte layer 30 and the thickness of the cover layer 50 have a lower limit. For example, it is preferable that the thickness of the solid electrolyte layer 30 is 1 μm or more. It is more preferable that the thickness is 5 μm or more. It is still more preferable that the thickness is 10 μm or more. It is preferable that the thickness of the cover layer 50 is 5 μm or more. It is more preferable that the thickness is 10 μm or more. It is still more preferable that the thickness is 20 μm or more.

On the other hand, from a viewpoint of improving the capacity density and the responsiveness, it is preferable that the solid electrolyte layer 30 has a small thickness. And so, it is preferable that the thickness of the solid electrolyte layer 30 has an upper limit. For example, it is preferable that the thickness of the solid electrolyte layer 30 is 100 μm or less. It is more preferable that the thickness is 50 μm or less. It is still more preferable that the thickness is 30 μm or less. From a viewpoint of improving the capacity density, it is preferable that the cover layer 50 has a small thickness. And so, it is preferable that the thickness of the cover layer 50 is 500 μm or less. It is more preferable that the thickness is 200 μm or less. It is still more preferable that the thickness is 100 μm or less.

From a viewpoint of improving the responsiveness, it is preferable that a volume ratio of the carbon material in the first internal electrode 10 and the volume ratio of the carbon material in the second internal electrode 20 are 1 vol % or more. It is more preferable that the volume ratios are 5 vol % or more. It is still more preferable that the volume ratios are 15 vol % or more. On the other hand, from a viewpoint of improving the capacity density, it is preferable that the volume ratios of the carbon material in the first internal electrode 10 and the second internal electrode 20 are 50 vol % or less. It is more preferable that the volume ratios are 45 vol % or less. It is still more preferable that the volume ratios are 40 vol % or less.

Figure 3:
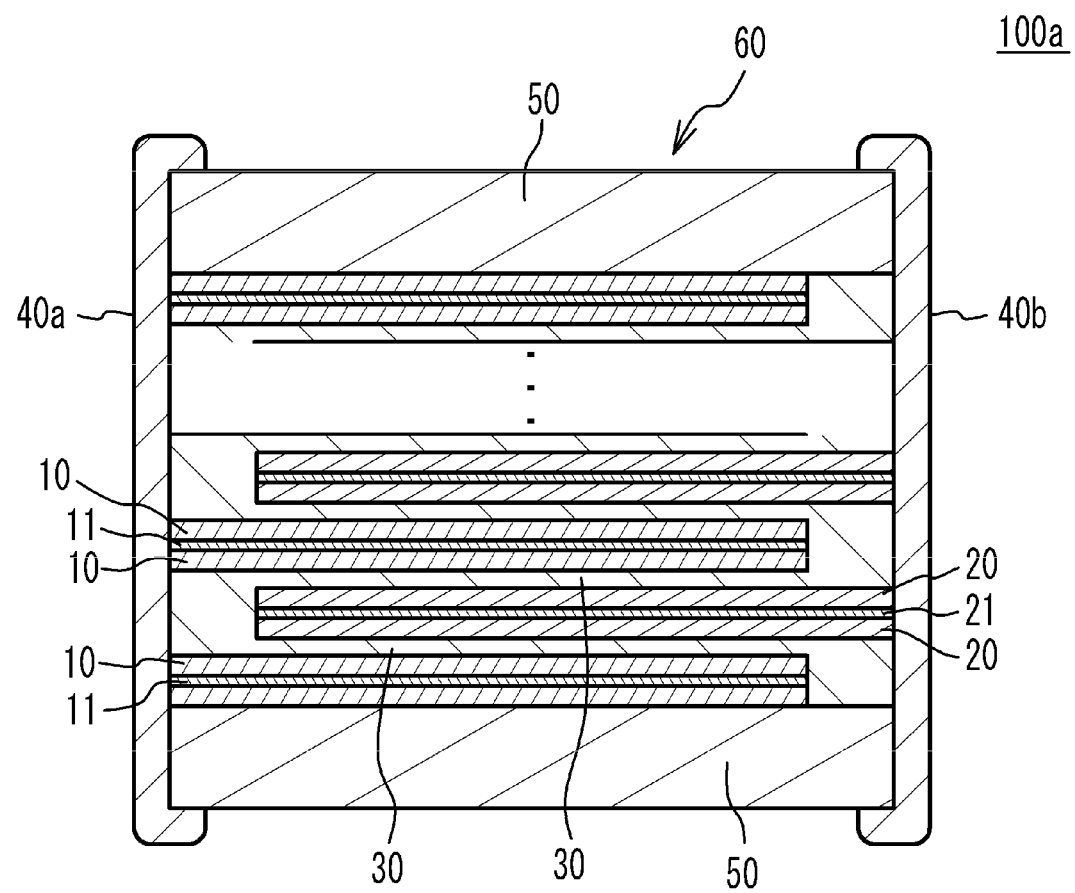
FIG. 3 illustrates a schematic cross section of another all solid battery.

The first internal electrode 10 and the second internal electrode 20 may have an electric collector layer. For example, as illustrated in FIG. 3, a first electric collector layer 11 may be formed inside of the first internal electrode 10. A second electric collector layer 21 may be formed inside of the second internal electrode 20. A main component of the first electric collector layer 11 and a main component of the second electric collector layer 21 are a conductive material. For example, as the conductive material of the first electric collector layer 11 and the conductive material of the second electric collector layer 21, a metal material, a carbon material or the like may be used. Current collecting efficiency may be improved, when the first electric collector layer 11 is connected to the first external electrode 40a and the second electric collector layer 21 is connected to the second external electrode 40b.

Figure 4:
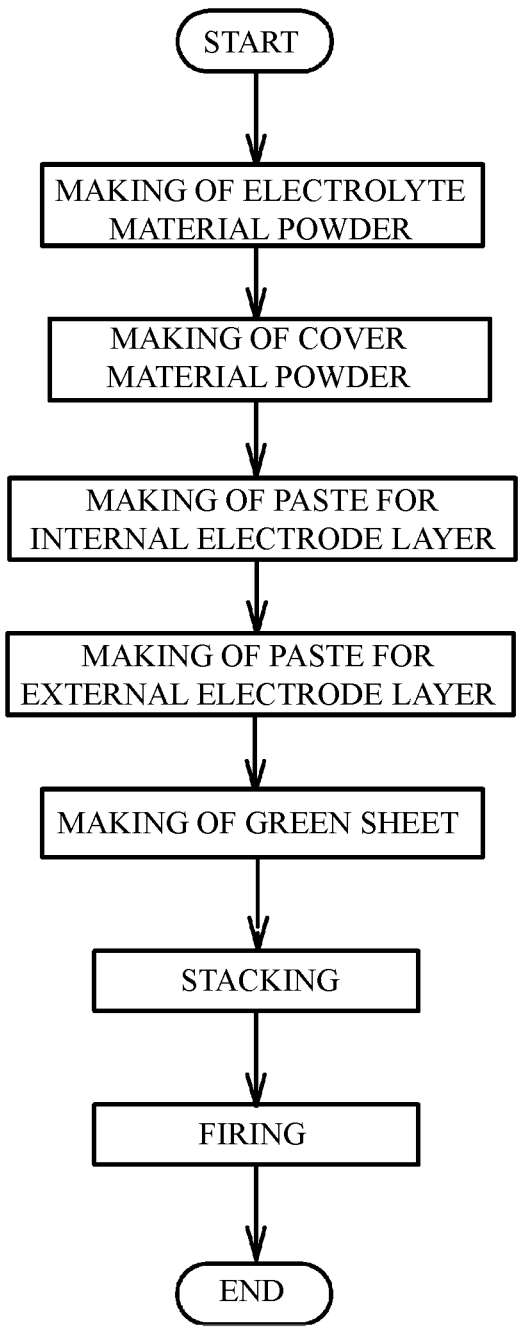
FIG. 4 illustrates a flowchart of a manufacturing method of an all solid battery.

A description will be given of a manufacturing method of the all solid battery 100a described in FIG. 2. FIG. 4 illustrates a flowchart of the manufacturing method of the all solid battery 100a.

(Making process of material powder for solid electrolyte layer) Material powder of solid electrolyte for the solid electrolyte layer 30 is made. For example, it is possible to make the material powder for solid electrolyte layer, by mixing raw material and additives and using solid phase synthesis method or the like. The resulting powder is subjected to dry grinding. Thus, an average particle diameter of the resulting powder is adjusted to a desired one. For example, it is possible to adjust the average particle diameter to the desired diameter with use of planetary ball mill using $ZrO_2$ ball of 5 mm φ.

Sintering assistant is added to the material powder. The sintering assistant includes one or more of glass components such as Li—B—O-based compound, Li—Si—O-based compound, Li—C—O-based compound, Li—S—O-based compound and Li—P—O-based compound. The amount of the sintering assistant is adjusted so that the Vickers hardness of the solid electrolyte layer 30 after the firing is larger than the Vickers hardness of the first internal electrode 10 and the Vickers hardness of the second internal electrode 20 after the firing.

(Making process of material powder for cover layer) Ceramic material powder of for the cover layer 50 is made. For example, it is possible to make the material powder for cover layer, by mixing raw material and additives and using solid phase synthesis method or the like. The resulting powder is subjected to dry grinding. Thus, an average particle diameter of the resulting powder is adjusted to a desired one. For example, it is possible to adjust the average particle diameter to the desired diameter with use of planetary ball mill using $ZrO_2$ ball of 5 mm ¢.

Sintering assistant is added to the material powder. The sintering assistant includes one or more of glass components such as Li—B—O-based compound, Li—Si—O-based compound, Li—C—O-based compound, Li—S—O-based compound and Li—P—O-based compound. The amount of the sintering assistant is adjusted so that the Vickers hardness of the cover layer 50 after the firing is larger than the Vickers hardness of the first internal electrode 10 and the Vickers hardness of the second internal electrode 20 after the firing.

(Making process of paste for internal electrode) Next, paste for internal electrode is made in order to make the first internal electrode 10 and the second internal electrode 20. For example, a conductive auxiliary agent, an electrode active material, a solid electrolyte material, a sintering assistant, a binder, a plasticizer and so on are evenly dispersed into water or organic solvent. Thus, paste for internal electrode layer is obtained. The above-mentioned solid electrolyte paste may be used as the solid electrolyte material. The carbon material may be used as the conductive auxiliary agent. The metal material may be used as the auxiliary agent, in addition to the carbon material. Pd, Ni, Cu, Fe, or alloy thereof may be used as the metal material. When the composition of the first internal electrode 10 is different from that of the second internal electrode 20, paste for internal electrode used for the first internal electrode 10 and another paste for internal electrode used for the second internal electrode 20 may be individually made.

The sintering assistant of the paste for internal electrode includes one or more of glass components such as Li—B—O-based compound, Li—Si—O-based compound, Li—C—O-based compound, Li—S—O-based compound and Li—P—O-based compound.

(Making process of paste for external electrode) Next, paste for external electrode is made in order to make the first external electrode 40a and the second external electrode 40b. It is possible to make the paste for external electrode, by evenly dispersing a conductive material, a glass frit, a binder, plasticizer and so on into water or organic solvent.

(Making process of solid electrolyte green sheet) The material powder for solid electrolyte layer is evenly dispersed into aqueous solvent or organic solvent together with a binding agent, a dispersing agent, a plasticizer and so on. The resulting powder is subjected wet crushing. And solid electrolyte slurry having a desired average particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is printed. Thus, a green sheet is obtained. The printing method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

Figure 5A:
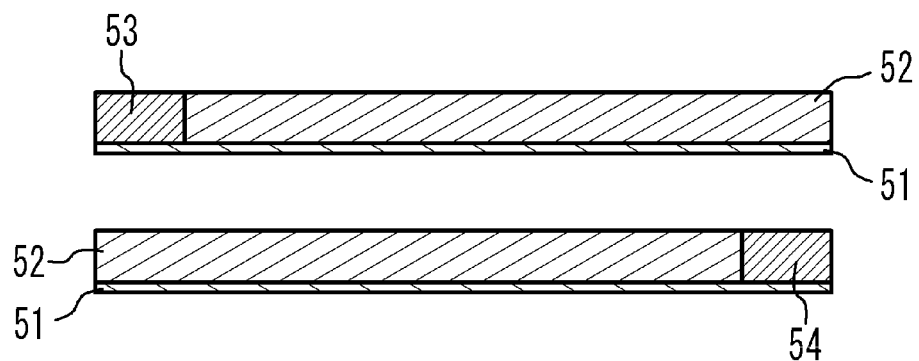
FIG. 5A and FIG. 5B illustrate a stacking process.
Figure 5B:
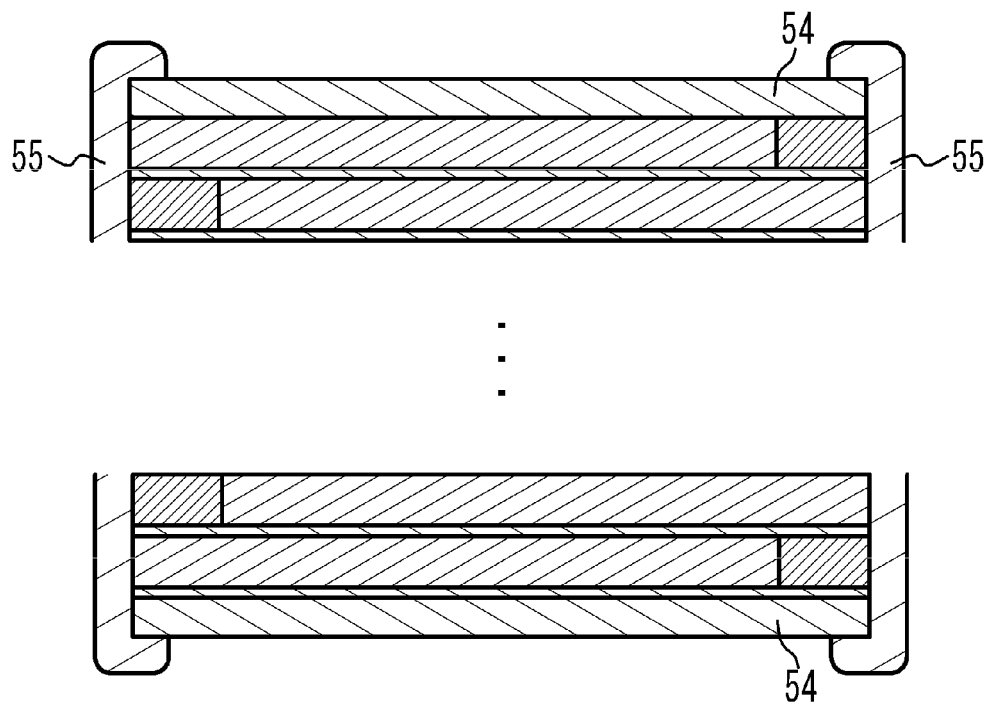

(Stacking process) Paste 52 for internal electrode is printed on one face of a solid electrolyte green sheet 51, as illustrated in FIG. 5A. A thickness of the paste 52 for internal electrode is equal to or more than a thickness of the solid electrolyte green sheet 51. A reverse pattern 53 is printed on a part of the solid electrolyte green sheet 51 where the paste 52 for electrode layer is not printed. A material of the reverse pattern 53 may be the same as that of the solid electrolyte green sheet 51. The solid electrolyte green sheets 51 after printing are stacked so that each of the solid electrolyte green sheets 51 is alternately shifted to each other. As illustrated in FIG. 5B, cover sheets 54 are crimped from an upper side and a lower side of the stacking direction. Thus, a multilayer structure is obtained. In this case, in the multilayer structure, each of the paste 52 for internal electrode is alternately exposed to the two end faces The cover sheet 54 is formed by printing the material powder for cover layer with the same method as the forming of the solid electrolyte green sheet. The thickness of the cover sheet 54 is larger than the thickness of the solid electrolyte green sheet 51. The cover sheet 54 may be thickened during printing of the cover sheet 54. A plurality of the printed sheets may be stacked and may be sed of the cover sheet 54.

Next, the two end faces are coated with paste 55 for external electrode by dipping method or the like. After that, the paste 55 for external electrode is dried. Thus, a compact for forming the all solid battery 100a is obtained.

(Firing process) Next, the multilayer structure is fired. In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the all solid battery 100 or the all solid battery 100a is manufactured.

In the manufacturing method of the embodiment, the thickness of the paste 52 for internal electrode is equal to or more than the thickness of the solid electrolyte green sheet 51. Therefore, after the firing process, the thicknesses of the first internal electrode 10 and the second internal electrode 20 are equal to more than the thickness of the solid electrolyte layer 30. And, the cell characteristic such as the capacity density or the responsiveness is improved. Moreover, the amount of the sintering assistant added to the material powder for the solid electrolyte layer and the amount of the sintering assistant added to the material powder for the cover layer are adjusted. Therefore, on the surface of the multilayer chip 60 after the firing process, the Vickers hardness of the solid electrolyte layer 30 and the Vickers hardness of the cover layer 50 are larger than the Vickers hardness of the first internal electrode 10 and the Vickers hardness of the second internal electrode 20. Therefore, the mechanical strength of the solid electrolyte layer 30 and the mechanical strength of the cover layer 50 are improved. And, it is possible to absorb the reduction of the mechanical strength of the first internal electrode 10 and the mechanical strength of the second internal electrode 20. And, the mechanical strength of the all solid battery 100a is improved. It is therefore possible to make the all solid battery 100a which is capable of securing the cell characteristic and the mechanical strength.

When the Vickers hardness of the solid electrolyte layer 30 and the Vickers hardness of the cover layer 50 are low, the all solid battery 100a may not necessarily achieve sufficient large mechanical strength. And so, it is preferable that the amount of the sintering assistant added to the material powder of the solid electrolyte layer and the amount of the sintering assistant added to the material powder of the cover layer have a lower limit. For example, it is preferable that the amount of the sintering assistant added to the material powder for the solid electrolyte layer is 0.3 mol % or more. It is more preferable that each of the amounts is 3 mol % or more. It is still more preferable that each of the amounts is 5 mol % or more. It is preferable that the amount of the sintering assistant added to the material powder for the cover layer is 0.3 mol % or more. It is more preferable that the amount is 3 mol % or more. It is still more preferable that the amount is 5 mol % or more. The mol % is a molar ratio in the main component of the solid electrolyte. Therefore, the total amount of the solid electrolyte and the sintering assistant is 100 mol %.

On the other hand, when the amount of the sintering assistant is large, composition gap may occur in the solid electrolyte layer 30 and the cover layer 50. And so, it is preferable that the amount of the sintering assistant added to the material powder for the solid electrolyte layer and the amount of the sintering assistant added to the material powder for the cover layer have an upper limit. For example, it is preferable that the amount of the sintering assistant added to the material powder fore solid electrolyte layer is 30 mol % or less. It is more preferable that the amount is 20 mol % or less. It is still more preferable that the amount is 10 mol % or less. It is preferable that the amount of the sintering assistant added to the material powder of the cover layer is 30 mol % or less. It is more preferable that the amount is 20 mol % or less. It is still more preferable that the amount is 10 mol % or less.

When the paste for internal electrode, paste for electric collector including a conducti material, and the paste for internal electrode are stacked in this order, it is possible to form the electric collector layer between the first internal electrode 10 and the second internal electrode 20.

EXAMPLES

The all solid batteries in accordance with the embodiment were made and the property was measured.

(Example 1) As the sintering assistant, amorphous powder was added to phosphoric acid-based solid electrolyte having a predetermined particle diameter. The amorphous powder was made by crushing $Li_3PO_4$. The phosphoric acid-based solid electrolyte and the sintering assistant were dispersed in dispersion medium. Thus, solid electrolyte slurry was obtained. The amount of the sintering assistant was 0.3 mol % with respect to $Li_{1.3}Al_{0.3}Ge_{1.7}(PO_4)_3$ acting as the main component of the solid electrolyte layer. A binder was added to the resulting solid electrolyte slurry. Thus, solid electrolyte paste was made. A green sheet was made by printing the solid electrolyte paste.

The electrode active material and the solid electrolyte material were highly dispersed with use of wet-bead mill. Thus, ceramic paste including only ceramic grains was made. Next, the ceramic paste and the conductive auxiliary agent were mixed Thus, paste for internal electrode was made.

The paste for internal electrode was printed on the solid electrolyte green sheet, with use of a screen having a predetermined pattern. 100 numbers of the green sheets after the printing were stacked so that each of the electrodes is alternately shifted to right and left.

As the sintering assistant, amorphous powder was added to phosphoric acid-based solid electrolyte having a predetermined particle diameter. The amorphous powder was made by crushing $Li_3PO_4$. The phosphoric acid-based solid electrolyte and the sintering assistant were dispersed in dispersion medium. Thus, solid electrolyte slurry was obtained. The amount of the sintering assistant was 0.3 mol % with respect to $Li_{1.3}Al_{0.3}Ge_{1.7}(PO_4)_3$ acting as the main component of the solid electrolyte layer. A binder was added to the resulting solid electrolyte slurry. Thus, paste for cover sheet was made. A cover sheet was made by printing the paste for cover sheet.

Cover layers in which the cover sheets were stacked were adhered to an upper face and a lower face of the multilayer structure of the stacked green sheets after the printing. The cover layers were crimped to the multilayer structure by a heating pressurizing press. The resulting multilayer structure was stamped into a predetermined size by a dicer. Thus, a multilayer structure having a rectangular parallelepiped shape was obtained. Two end faces of the resulting multilayer structure to which the paste for internal electrode was exposed were coated with the paste for external electrode by a dipping method or the like. After that, the paste for external electrode was dried. After that, the binder was removed by a thermal treatment of 300 degrees C. or more and 500 degrees C. or less. And, the resulting multilayer structure was subjected to a thermal treatment of 900 degrees C. or less. In the thermal treatment, each compound was sintered. Thus, a sintered structure was obtained.

The thicknesses of the first internal electrode 10 and the second internal electrode 20 after the firing process were 30 μm. The thickness of the solid electrolyte layer 30 after the firing process was 10 μm. The thickness of the cover layer 50 after the firing process was 20 μm.

(Example 2) In the example 2, the amount of the sintering assistant added to the material powder for the cover layer was 3 mol %. Other conditions were the same as those of the example 1.

(Example 3) In the example 3, the amount of the sintering assistant added to the material powder for the solid electrolyte layer was 3 mol %. The amount of the sintering assistant added to the material powder for the cover layer was 3 mol %. Other conditions were the same as those of the example 1.

(Example 4) In the example 4, the amount of the sintering assistant added to the material powder for the solid electrolyte layer was 5 mol %. The amount of the sintering assistant added to the material powder for the cover layer was 5 mol %. Other conditions were the same as those of the example 1.

(Example 5) In the example 5, the amount of the sintering assistant added to the material powder for the solid electrolyte layer was 10 mol %. The amount of the sintering assistant added to the material powder for the cover layer was 10 mol %. Other conditions were the same as those of the example 1.

(Example 6) In the example 6, the amount of the sintering assistant added to the material powder for the solid electrolyte layer was 3 mol %. The amount of the sintering assistant added to the material powder for the cover layer was 3 mol %. The thicknesses of the first internal electrode 10 and the second internal electrode 20 after the firing process were 60 μm. Other conditions were the same as those of the example 1.

(Comparative example 1) In the comparative example 1, the amount of the sintering assistant added to the material powder for the solid electrolyte layer was 0.1 mol %. The amount of the sintering assistant added to the material powder for the cover layer was 0.1 mol %. Other conditions were the same as those of the example 1.

(Comparative example 2) In the comparative example 2, the amount of the sintering assistant added to the material powder for the solid electrolyte layer was 0.01 mol %. The amount of the sintering assistant added to the material powder for the cover layer was 0.01 mol %. Other conditions were the same as those of the example 1.

(Comparative example 3) In the comparative example 3, the amount of the sintering assistant added to the material powder for the solid electrolyte layer was 0.05 mol %. The amount of the sintering assistant added to the material powder for the cover layer was 0.05 mol %. Other conditions were the same as those of the example 1.

(Comparative example 4) In the comparative example 4, the thicknesses of the first internal electrode 10 and the second internal electrode 20 after the firing process were 60 μm. Other conditions were the same as those of the example 1.

(Comparative example 5) In the comparative example 5, the amount of the sintering assistant added to the material powder for the solid electrolyte layer was 3 mol %. The thicknesses of the first internal electrode 10 and the second internal electrode 20 after the firing process were 60 μm. Other conditions were the same as those of the example 1.

(Comparative example 6) In the comparative example 6, the amount of the sintering assistant added to the material powder for the cover layer was 3 mol %. The thicknesses of the first internal electrode 10 and the second internal electrode 20 after the firing process were 60 μm. Other conditions were the same as those of the example 1.

(Hardness test) With respect to each of the all solid batteries of the examples 1 to 6 and the comparative examples 1 to 6, the Vickers hardness of the surface of the first internal electrode 10, the Vickers hardness of the surface of the second internal electrode 20, the Vickers hardness of the surface of the solid electrolyte layer 30, and the Vickers hardness of the surface of the cover layer 50 were measured. The Vickers hardness was calculated by measuring the length of the diagonal lines of the indentation formed by pressing at load of 25 gf for 10 seconds. Table 1 and Table 2 show the results.

TABLE 1

| | ELECTRODE THICKNESS (μm) | ELECTRODE HARDNESS (Hv) | ELECTROLYTE LAYER THICKNESS (μm) | SINTERING ASSISTANT AMOUNT OF ELECTROLYTE LAYER (mol %) | ELECTROLYTE LAYER HARDNESS (Hv) |
|---|---|---|---|---|---|
| EXAMPLE 1 | 30 | 282 | 10 | 0.3 | 303 |
| EXAMPLE 2 | 30 | 280 | 10 | 0.3 | 314 |
| EXAMPLE 3 | 30 | 293 | 10 | 3 | 412 |
| EXAMPLE 4 | 30 | 289 | 10 | 5 | 512 |
| EXAMPLE 5 | 30 | 282 | 10 | 10 | 633 |
| EXAMPLE 6 | 60 | 282 | 10 | 3 | 410 |
| COMPARATIVE EXAMPLE 1 | 30 | 280 | 10 | 0.1 | 268 |

TABLE 1-continued

| | ELECTRODE THICKNESS (μm) | ELECTRODE HARDNESS (Hv) | ELECTROLYTE LAYER THICKNESS (μm) | SINTERING ASSISTANT AMOUNT OF ELECTROLYTE LAYER (mol %) | ELECTROLYTE LAYER HARDNESS (Hv) |
|---|---|---|---|---|---|
| COMPARATIVE EXAMPLE 2 | 30 | 277 | 10 | 0.01 | 205 |
| COMPARATIVE EXAMPLE 3 | 30 | 277 | 10 | 0.05 | 166 |
| COMPARATIVE EXAMPLE 4 | 60 | 340 | 10 | 0.3 | 290 |
| COMPARATIVE EXAMPLE 5 | 60 | 289 | 10 | 3 | 311 |
| COMPARATIVE EXAMPLE 6 | 60 | 345 | 10 | 0.3 | 288 |

TABLE 2

| | COVER THICKNESS (μm) | SINTERING ASSISTANT AMOUNT OF COVER LAYER (mol %) | COVER HARDNESS (Hv) | MOUNTING |
|---|---|---|---|---|
| EXAMPLE 1 | 20 | 0.3 | 295 | ○ |
| EXAMPLE 2 | 20 | 3 | 337 | ○ |
| EXAMPLE 3 | 20 | 3 | 350 | ○ |
| EXAMPLE 4 | 20 | 5 | 393 | ○ |
| EXAMPLE 5 | 20 | 10 | 448 | ○ |
| EXAMPLE 6 | 20 | 3 | 352 | ○ |
| COMPARATIVE EXAMPLE 1 | 20 | 0.1 | 255 | X |
| COMPARATIVE EXAMPLE 2 | 20 | 0.01 | 221 | X |
| COMPARATIVE EXAMPLE 3 | 20 | 0.05 | 181 | X |
| COMPARATIVE EXAMPLE 4 | 20 | 0.3 | 278 | X |
| COMPARATIVE EXAMPLE 5 | 20 | 0.3 | 270 | X |
| COMPARATIVE EXAMPLE 6 | 20 | 3 | 300 | X |

As shown in Table 1 and Table 2, in the example 1, the Vickers hardness (Hv) of the first internal electrode 10 and the second internal electrode 20 was 282. The Vickers hardness (Hv) of the solid electrolyte layer 30 was 303. The Vickers hardness of the cover layer 50 was 295. In the example 2, the Vickers hardness (Hv) of the first internal electrode 10 and the second internal electrode 20 was 280. The Vickers hardness (Hv) of the solid electrolyte layer 30 was 314. The Vickers hardness of the cover layer 50 was 337. In the example 3, the Vickers hardness (Hv) of the first internal electrode 10 and the second internal electrode 20 was 293. The Vickers hardness (Hv) of the solid electrolyte layer 30 was 412. The Vickers hardness of the cover layer 50 was 350. In the example 4, the Vickers hardness (Hv) of the first internal electrode 10 and the second internal electrode 20 was 289. The Vickers hardness (Hv) of the solid electrolyte layer 30 was 512. The Vickers hardness of the cover layer 50 was 393. In the example 5, the Vickers hardness (Hv) of the first internal electrode 10 and the second internal electrode 20 was 282. The Vickers hardness (Hv) of the solid electrolyte layer 30 was 633. The Vickers hardness of the cover layer 50 was 448. In the example 6, the Vickers hardness (Hv) of the first internal electrode 10 and the second internal electrode 20 was 282. The Vickers hardness (Hv) of the solid electrolyte layer 30 was 410. The Vickers hardness of the cover layer 50 was 352.

In the comparative example 1, the Vickers hardness (Hv) of the first internal electrode 10 and the second internal electrode 20 was 280. The Vickers hardness (Hv) of the solid electrolyte layer 30 was 268. The Vickers hardness of the cover layer 50 was 255. In the comparative example 2, the Vickers hardness (Hv) of the first internal electrode 10 and the second internal electrode 20 was 277. The Vickers hardness (Hv) of the solid electrolyte layer 30 was 205. The Vickers hardness of the cover layer 50 was 221. In the comparative example 3, the Vickers hardness (Hv) of the first internal electrode 10 and the second internal electrode 20 was 277. The Vickers hardness (Hv) of the solid electrolyte layer 30 was 166. The Vickers hardness of the cover layer 50 was 181. In the comparative example 4, the Vickers hardness (Hv) of the first internal electrode 10 and the second internal electrode 20 was 340. The Vickers hardness (Hv) of the solid electrolyte layer 30 was 290. The Vickers hardness of the cover layer 50 was 278. In the comparative example 5, the Vickers hardness (Hv) of the first internal electrode 10 and the second internal electrode 20 was 289. The Vickers hardness (Hv) of the solid electrolyte layer 30 was 311. The Vickers hardness of the cover layer 50 was 270. In the comparative example 6, the Vickers hardness (Hv) of the first internal electrode 10 and the second internal electrode 20 was 345. The Vickers hardness (Hv) of the solid electrolyte layer 30 was 288. The Vickers hardness of the cover layer 50 was 300.

(Mounting test) Next, each of the all solid batteries of the examples 1 to 6 and the comparative examples 1 to 6 was subjected to a mounting test. In the mounting test, each of the all solid batteries was mounted on a substrate by a known method. It was confirmed whether crack or defect occurred, with respect to 50 samples of each of the examples 1 to 6 and the comparative examples 1 to 6. When the number of samples in which the crack or the defect occurred was zero among the 50 samples of the example or the comparative example, the example or the comparative example was determined as good "○" When the number of samples in which the crack or the defect occurred was one or more among the 50 samples of the example or the comparative example, the example or the comparative example was determined as bad "×".

The comparative examples 1 to 6 were determined as bad in the mounting test. It is thought that this was because at least one of the Vickers hardness of the solid electrolyte layer 30 and the Vickers hardness of the cover layer 50 was not larger than the Vickers hardness of the first internal electrode 10 and the Vickers hardness of the second internal electrode 20, and sufficient mechanical strength was not achieved. On the other hand, the examples 1 to 6 were determined as good in the mounting test. It is thought that this was because both of the Vickers hardness of the solid electrolyte layer 30 and the Vickers hardness of the cover layer 50 were larger than the Vickers hardness of the first internal electrode 10 and the Vickers hardness of the second internal electrode 20, and sufficient mechanical strength was achieved.

Although the embodiments of the present invention have been described in detail, it is to be understood that the various change, substitutions, and alterations could be made hereto without departing from the spirit and scope of the invention.

What is claimed is:

1. An all solid battery comprising: a multilayer structure in which each of a plurality of solid electrolyte layers and each of a plurality of internal electrodes are alternately stacked, each of the plurality of internal electrodes consists of an electrode active material, a solid electrolyte and a conductive auxiliary agent, the multilayer structure having a rectangular parallelepiped shape, the plurality of internal electrodes being alternately exposed at two different faces of the multilayer structure to an outer surroundings of the multilayer structure; a first cover layer provided on an upper face of the multilayer structure in a stacking direction; and a second cover layer provided on a lower face of the multilayer structure in the stacking direction, wherein each thickness of the plurality of internal electrodes is equal to or more than each thickness of the plurality of solid electrolyte layers, wherein Vickers hardness of the plurality of solid electrolyte layers and Vickers hardness of the first and second cover layers are larger than Vickers hardness of the plurality of internal electrodes, wherein the plurality of solid electrolyte layers, the first cover layer and the second cover layer are made of $Li_{1.3}Al_{0.3}Ge_{1.7}(PO_4)_3$, wherein each of the plurality of solid electrolyte layers, the first cover layer and the second cover layer includes a sintering assistant of $Li_3PO_4$, and wherein an amount of the sintering assistant in each of the plurality of solid electrolyte layers, the first cover layer and the second cover layer is 0.3 mol % or more and 10 mol % or less.

2. The all solid battery as claimed in claim 1, wherein the Vickers hardness (Hv) of the plurality of solid electrolyte layers is 300 or more.

3. The all solid battery as claimed in claim 1, wherein the Vickers hardness (Hv) of the first and second cover layers is 280 or more.

4. The all solid battery as claimed in claim 1, wherein the Vickers hardness of the plurality of solid electrolyte layers is larger than the Vickers hardness of the first and second cover layers.

5. The all solid battery as claimed in claim 1, wherein a volume ratio of the conductive carbon material in each of the plurality of internal electrodes is 1 vol % or more and 50 vol % or less.

6. The all solid battery as claimed in claim 1, wherein a thickness of each of the plurality of internal electrodes is larger than a thickness of each of the plurality of solid electrolyte layers.

* * * * *